July 21, 1959
G. L. HELLER
2,895,804
MANUFACTURE OF CARBON BLACK
Filed July 16, 1957
2 Sheets-Sheet 2
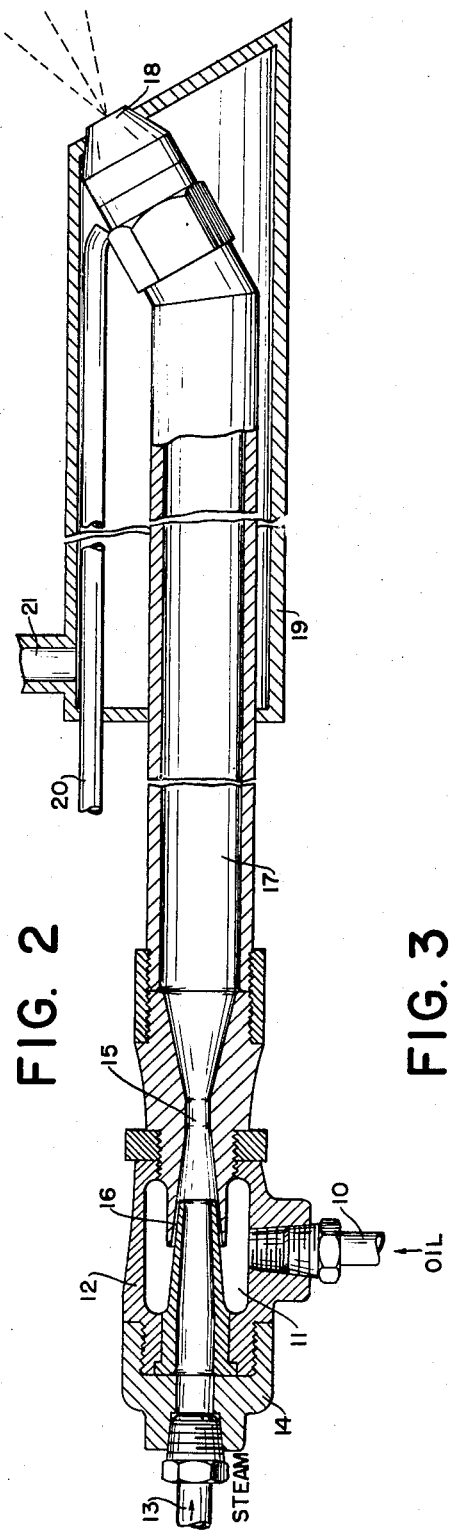
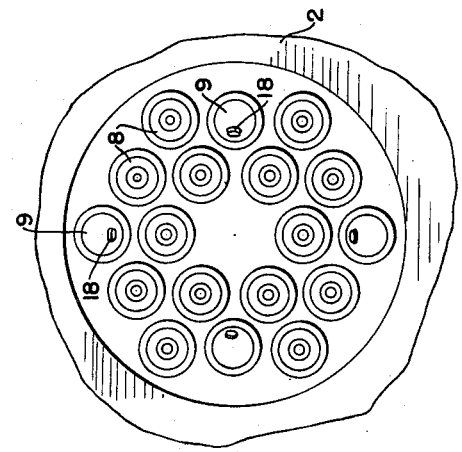
INVENTOR
GEORGE L. HELLER
BY
*Pennie, Edmonds, Morton, Barrows & Taylor*
ATTORNEYS

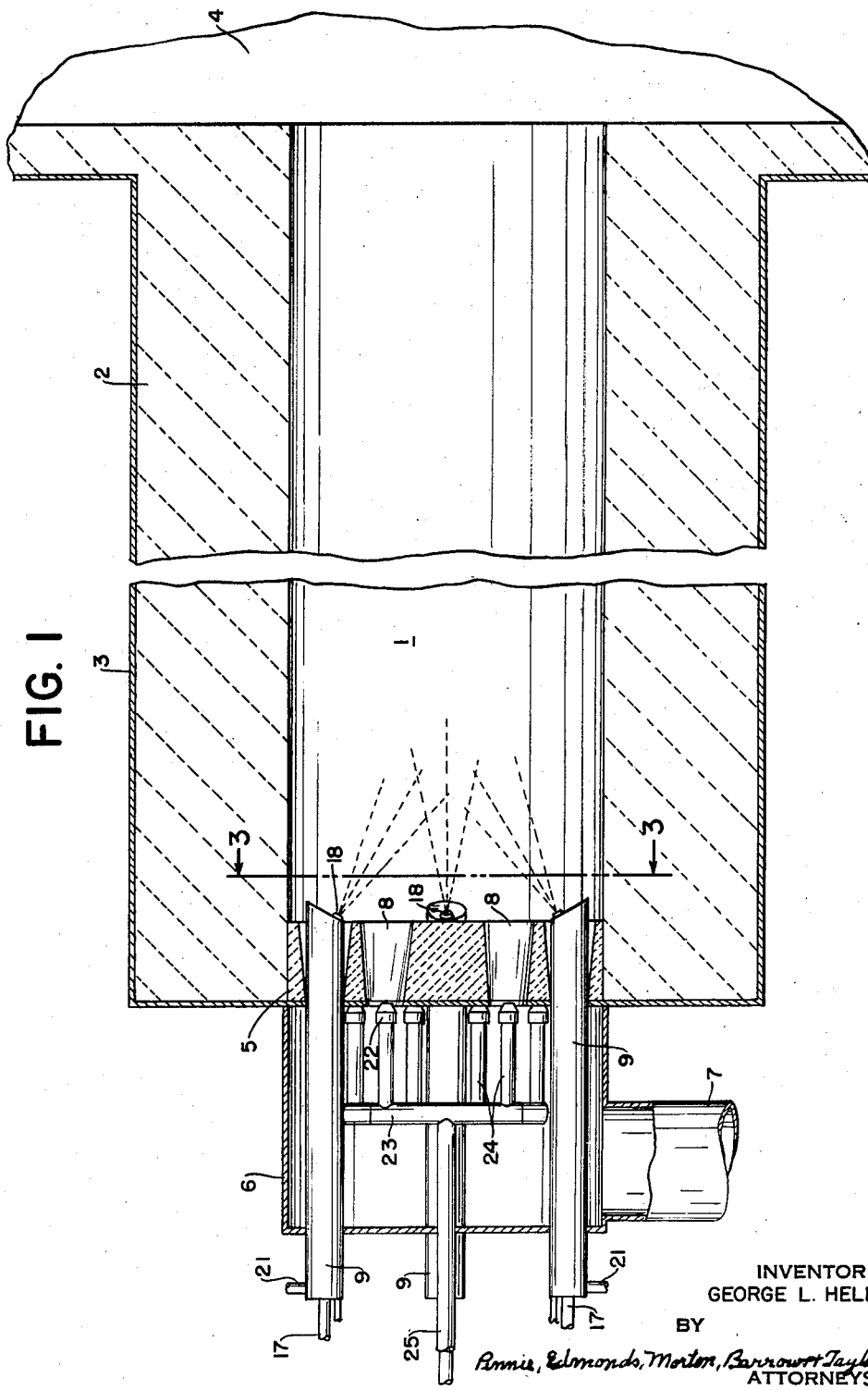

United States Patent Office 2,895,804
Patented July 21, 1959

2,895,804

MANUFACTURE OF CARBON BLACK

George L. Heller, Monroe, La., assignor to Columbian Carbon Company, New York, N.Y., a corporation of Delaware Application July 16, 1957, Serial No. 672,282

8 Claims. (Cl. 23—209.4)

This invention relates to improvements in the manufacture of carbon black by the decomposition of hydrocarbons effected by dispersing the hydrocarbons in a stream of hot gases. More particularly, the invention provides an improved process of that type whereby carbon blacks having a particularly desirable combination of characteristics may be economically produced.

Carbon blacks are extensively used for many purposes. They vary widely as to their characteristics and combinations of characteristics by which they are adapted to different specific uses.

One of their most important present day uses is in the compounding of rubber, both synthetic and natural. It is well recognized that carbon black greatly improves the properties of rubber, including tensile strength and wear resistance, and that the characteristics of the carbon black used materially influence the properties of the final rubber products, automobile tires for instance.

The public today demands automobile tires which are soft-riding, quiet in operation, long wearing and efficient as to gasoline consumption. It is recognized that the tensile strength and wear resistance of automobile tires generally increases as the particle size of the carbon black used in compounding the rubber is decreased. But it is likewise known that the hysteresis properties of the automobile tire usually become less desirable as the particle size of the carbon black used is decreased.

When vulcanized rubber is deformed, the energy thus expended is converted to heat. As the rubber returns to its original form, only a portion of the energy required to deform the rubber is restored. This loss in energy is known as "hysteresis loss" and is evidenced by an increase in temperature of the rubber. Hysteresis is, of course, closely related to resilience, which may be defined as the ratio of energy given up on recovery from deformation to the energy required to produce the deformation. Soft riding, quietness and gasoline consumption efficiency of automobile tires and also temperature increase in operation are dependent primarily upon resilience, or rebound, of the rubber from which the tires are fabricated. Excessive temperature causes deterioration of the tire cords, thus increasing the danger of tire failure, and such heat build-up is promoted by poor hysteresis properties, low resilience, low rebound.

It is a primary object of my present invention to produce a carbon black of sufficient fineness to develop in rubber, with which it is compounded, high tensile strength and good-wearing properties, without sacrificing hysteresis properties, and without undue sacrifice in yield.

This and other objects are attained by my new process, as more fully hereinafter described.

In the Wiegand and Braendle Patent 2,499,438, there is described and claimed a method of producing carbon blacks in accordance with which a multiplicity of streams of a fluid fuel and an oxygen-containing gas are blasted longitudinally into the upstream end of an elongated, heat-insulated, unobstructed reaction chamber, the entering streams of the combustible mixture being uniformly spaced over the transverse area of the chamber and are burned as they enter the chamber so as to produce a uniform, high velocity, turbulent stream of hot blast flame gases flowing longitudinally through the furnace chamber. According to that patent, the hydrocarbon to be decomposed, herein designated "hydrocarbon make," is likewise injected longitudinally into the upstream end of the chamber as a plurality of symmetrically positioned streams flanked on all sides by the burning streams of the incoming combustible mixture.

The process of said patent has been extensively used for the production of carbon blacks highly valuable in the reinforcing of rubber. Especially where the hydrocarbon make is injected as a gas or vapor, the entering hydrocarbon is rapidly, substantially instantaneously, dispersed in the turbulent stream of hot blast flame gases. It is decomposed by heat absorbed therefrom to form carbon black in gaseous suspension, which is passed from the downstream end of the furnace chamber and the carbon black separated from the furnace effluent gases.

The process of my present invention resembles, in some respects, the process of said patent, just described, but is primarily distinguished therefrom by the manner in which the hydrocarbon make is injected into the hot gas stream.

I find it especially advantageous, in accordance with my present invention, to use a furnace chamber of circular cross-section. However, the invention in its broader aspect is not so restricted. I generate within the chamber a turbulent stream of hot blast flame gases, as just described, flowing through the chamber at a velocity within the range of 2000 to 8000 feet per minute calculated at 2500° F. I separately introduce the hydrocarbon make through the upstream end wall of the chamber as a plurality of symmetrically positioned streams. But unlike the process specifically described in the patent, just noted, I forcefully inject the hydrocarbon make streams into the steam of hot gases, as separate, gas-atomized, expanding liquid spray so directed that the inwardly extended axes of symmetry of the respective sprays converge at a downstream point lying on the longitudinal axis of the chamber, forming an angle within the range of 15° to 45° with the chamber axis.

The initial velocity of the incoming spray streams should be sufficiently greater than the velocity of the blast flame gases so that the spray streams are not materially deflected from their directed course before the oil has been substantially vaporized. This condition is readily observable through peep-holes such as are usually provided for examining the interior of reaction chambers during operation and is generally obtained by using an initial jet velocity within the range of 10 to 25 times the velocity of the blast flame gas stream, calculated as indicated above. The optimum spray-stream initial velocity will depend upon the velocity of the blast flame gases and also will vary somewhat with the angle of spread of the respective spray nozzles. Most advantageously, I use spray nozzles having a relatively narrow spread angle of approximately 15°, but wider-angle nozzles may be used. The angle of injection must be such, relative to the spread angle, that the entire spray is directed inwardly away from the chamber side wall.

The invention will be further described and illustrated with reference to the accompanying drawings which represent conventionally and somewhat diagrammatically apparatus which has been used with particular advantage in carrying out my process and of which:

Fig. 1 is a longitudinal sectional view of an elongated cylindrical furnace showing means for generating the hot blast flame gases and for injecting the hydrocarbon make, Fig. 2 is a longitudinal sectional view of a mixing and injecting assembly adapted to the injection of the hydrocarbon make, and Fig. 3 is a transverse view of the furnace chamber of Fig. 1 along line 3—3.

Referring more particularly to Figs. 1 and 3, the reaction chamber is indicated at 1 and is delineated by side walls 2 of furnace refractory and heat-insulating material, surrounded by a metal casing 3. The length and diameter of this chamber are subject to considerable variation, but preferably its length should be not less than about 10 times its diameter. At its downstream end, the reaction chamber opens into a cooler of conventional type, fragmentarily indicated at 4. The upstream end of the chamber is closed by a burner block 5 fitted snugly into the mouth of the chamber, the outer end of the burner block being enclosed by wind-box indicated at 6, to which air for combustion is fed under pressure from any convenient source through the conduit 7.

As appears more clearly from Fig. 3, the burner block is provided with a multiplicity of blast ports 8 symmetrically and substantially uniformly dispersed over the face of the burner block.

Four assemblies for atomizing and injecting the hydrocarbon make into the furnace chamber are represented at 9, extending through the burner block with their longitudinal axes parallel to the longitudinal axis of the furnace chamber and symmetrically positioned around the outer portion of the burner block. The number of injection assemblies used is subject to considerable variation. For maximum benefit, I have found it necessary to use at least two oppositely positioned injection assemblies. Three such assemblies spaced 120° apart may be used with advantage. Four such assemblies, as shown in the drawing, have been found most advantageous for circular furnaces of about 22 inches in diameter but even more than four injection assemblies may be used.

Various types of injection assemblies may be used in accordance with my present invention. Most advantageously I use asesmblies of the type represented in Fig. 2 of the drawing, whereby the oil is atomized and suspended in the atomizing gas outside of the furnace chamber, i.e. before being passed through the burner block. In its operation, the oil is passed as a liquid stream through conduit 10 to chamber 11 of an eductor type mixer 12. Steam or other atomizing gas, air for instance, is supplied under pressure through conduit 13 and forced through the conical orifice 14, and injected at high velocity through the Venturi throat 15. According to well-recognized eductor principles, the oil is drawn into the Venturi throat from chamber 11 through the narrow annular passageway 16. The resultant highly atomized suspension of liquid droplets passes from the Venturi throat through conduit 17, which extends through the burner block to spray nozzle 18 positioned just beyond the inner face of the burner block. Where air is used as the atomizing gas, it is generally advantageous to preheat the air to assist in effecting the atomization, especially where the hydrocarbon make is a heavy residuum oil.

Ordinarily, the burner block will not be at a sufficiently high temperature to necessitate extraordinary thermal shielding of the atomized stream passing therethrough. However, where desired, that portion of conduit 17 extending through the burner block, and the inner portion of spray nozzle 18, may be enclosed within jacket 19, to which water or other cooling medium is charged, through conduit 20 to the inner end of the jacket, and is discharged therefrom through outlet 21.

The longitudinal axis of the spray nozzle 18 in the apparatus shown forms an angle of about 30° with the extended longitudinal axis of the main body of tube 17. This angle determines the angle at which the axis of symmetry of the spray converges upon the longitudinal axis of the furnace chamber and may vary, as previously noted, within the range of about 15° to about 45°. Most advantageous results have been obtained where this angle is within the range of 15°–30°, using spray nozzles having an angle of spray of about 15°.

In place of the assembly shown, other types of injection and atomizing assemblies may be used. For instance, the hydrocarbon make, as a liquid stream, and the atomizing gas may be separately passed through the burner block, and the two streams mixed and the oil atomized by a conventional mixing and atomizing nozzle used in lieu of spray nozzle 18, shown in Fig. 2 of the drawing.

For generating the hot blast flame gases, various fluid fuels may be used, more advantageously in gas or vapor form. I have, with particular advantage, used natural gas as the fuel by injecting a stream thereof inwardly into each of the burner ports through spuds 22, to which it is supplied from header 23, through branch pipes 24 leading to the respective spuds. The fuel is supplied to header 23 through fuel conduit 25.

An advantage of using a spray assembly of the type shown in Fig. 2 is the relatively large amount of atomizing gas which may be used therewith. It presently appears that the forming of a carbon black having the combined properties desired is promoted by the use of relatively large volumes of atomizing gas per gallon of oil. More particularly, volumes of atomizing gas in excess of 100 cubic feet per gallon of oil appear to be necessary in order to produce a carbon black of optimum fineness. The use of such large volumes of atomizing gas also increases the velocity at which the sprays enter the furnace chamber, thus assisting in the maintenance of the directional flow of the spray streams toward the previously described locus. Atomizing gas volumes of 100–150 cubic feet per gallon of oil have been used with particular advantage.

As previously noted herein, the rubber compounder has frequently, heretofore, been faced with the necessity of a compromise in his selection of a carbon black to be compounded with the rubber. By selecting one of sufficiently small particle size to obtain maximum abrasion properties, he has been unable to avoid resultant poor hysteresis characteristics.

I have found, most surprisingly, that by the process of my present invention, I can produce carbon blacks which impart to rubber compositions maximum abrasion properties without the customary increase in hysteresis loss. I am presently unable to describe with certainty the peculiar characteristics of this carbon black which are responsible for these anomalous results. However, it appears from extensive study, that the peculiar rubber compounding characteristics of the carbon black are due, in part at least, to an unusual type of structure characteristic of the black.

Structure is defined as a joining together of the carbon black particles in reticulate chains. Conventional carbon blacks examined under the electron microscope at 100,000 magnification may be characterized as having a "stringy" structure, generally showing long chains of connected particles. When similarly examined, the carbon black resulting from my present process shows much less of this stringy structure, the particles appearing to be bound together largely in a manner resembling a brush-heap. Also, microtomed specimens of rubber, in which my present carbon black has been compounded, when examined under the electron microscope at 25,000 magnifications, show a persistence of this "brush-heap" structure within the rubber.

In addition to this difference in physical structure, there is evidence of differences in surface chemistry.

It appears that the peculiarities of this carbon black, with respect to structure and surface chemistry characteristics, are due to the conditions under which the carbon particles are born in my present process. By injecting the entering streams of hydrocarbon make, as herein described, toward a common point lying on the longitudinal axis of the furnace chamber, it seems probable that the carbon particles are born in closer proximity to each other thereby promoting the formation of the "brush-heap" type structure. It also seems probable that a more reduced state of the functional groups on the surfaces of the carbon particles, is caused by a more reducing atmosphere in the furnace chamber at the zone of carbon particle birth.

It will be understood that the foregoing is an attempt to rationalize the peculiarities of the carbon blacks resulting from the present process, but I do not intend to be bound in any way by the theories which I have advanced. However, it also appears essential to the obtaining of these characteristics that the spray streams of the liquid hydrocarbon make be subjected to the action of the hot blast flame gas stream, as herein described, during or just prior to initiation of the pyrolysis.

The invention will be further described and illustrated by the following specific examples of operations carried out, in accordance with the present invention, in the specific apparatus shown by the drawing in which the diameter of the furnace chamber was 22 inches. In each of these operations, the blast flame gases were generated by injecting into the furnace chamber a mixture of air, at the rate of 120,000 cubic feet per hour, and natural gas in sufficient quantity to produce an air-gas ratio of 9:1. The hydrocarbon make was injected at the rate of 90 gallons per hour through four atomizing and injection assemblies, of the type shown in Fig. 2 of the drawings, equipped with spray nozzles having an angle of spread of 15° and angled so that the inwardly extended axis of symmetry of the respective sprays form an angle of 30° with the longitudinal axis of the furnace chamber. The opening in the spray nozzles was 3/8 inch, and the atomizing fluid was air preheated to a temperature of 650° F. and at a pressure of 75 pounds per square inch. Other operational details are set forth in the subsequent tabulations, the volumes of atomizing air being calculated at normal temperature and pressure, the spray velocities being the initial nozzle tip velocity calculated at an oil temperature of 450° F. and the blast flame gas velocity being calculated at a temperature of 2500° F. and normal pressure.

|  | Example I | Example II |
|---|---|---|
| Atomizing air, cu. ft. per gallon of make | 130 | 140 |
| Make oil temperature, ° F | 294 | 291 |
| Nozzle tip velocity, ft./sec | 1,850 | 2,000 |
| Blast gas velocity, ft./sec | 80 | 80 |
| Yield, lbs./gal. of make | 211 | 230 |

|  | Example I | Example II |
|---|---|---|
| ABC color value | 137 | 139 |
| Oil absorption—gallons per 100 lbs. of black | 15.0 | 14.4 |
| Iodine absorption | 108 | 94 |
| DPG absorption | 8.55 | 7.75 |

In determining the rubber compounding characteristics of these two products, each was compounded with a low temperature polymer of butadiene and styrene (LTP) in accordance with the following formulation:

| LTP | 100 |
|---|---|
| Carbon black | 50 |
| Zinc oxide | 3 |
| Stearic acid | 2 |
| Asphaltic flux plasticizer | 4 |
| Hydrocarbon extender oil | 4 |
| N-cyclohexyl-2-benzothiazole sulfenamide | 1.125 |
| Sulfur | 2 |
| | 166.125 |

The resultant rubber compositions were formed and cured at a temperature of 290° F. for sixty minutes and tested according to conventional test procedure with the following results, expressed as percentages of comparable rubber compositions compounded with a standard commercial ISAF type carbon black of comparable particle size.

|  | Example I, percent | Example II, percent |
|---|---|---|
| Modulus, L-300 | 103 | 104 |
| Tensile strength | 105 | 107 |
| Elongation | 101 | 99 |
| Shore hardness | 97 | 98 |
| Rebound | 105 | 107 |
| Temperature rise | 95 | 92 |

In the foregoing tabulations, the rebound and temperature rise tests were made on samples of the rubber compositions which had been cured for ninety minutes, instead of the sixty minutes previously indicated, other conditions being comparable.

The distinctly improved hysteresis characteristics of these carbon blacks is evidenced by the relatively high rebound values and relatively low temperature rise values appearing in the foregoing tabulation.

The hydrocarbon makes used in the foregoing Examples I and II were heavy aromatic petroleum residues having approximately the following characteristics:

|  | Example I | Example II |
|---|---|---|
| Viscosity SSU at: | | |
| 100° F | 690 | 850 |
| 130° F | 231 | 230 |
| 210° F | 52 | 47 |
| Index of refraction | 1.648 | 1.645 |
| API gravity | 2.2 | 1.8 |
| Aromatics, percent | 70.8 | 79.4 |
| Ramsbottom carbon residue, percent | 11.22 | 8.98 |
| Sulfur, percent | 0.46 | 1.63 |
| Ash, percent | .028 | .126 |

It will be understood, however, that the process is not restricted to the use of hydrocarbon makes of these particular types, but it is of general utility in the production of carbon blacks from any other normally liquid hydrocarbons, distillates or residues, conventionally used in carbon black processes.

In using heavy petroleum residues of the types just illustrated, it is particularly advantageous, as previously noted herein, to preheat the atomizing gas. Also, the hydrocarbon make may be preheated in order to increase its fluidity and promote better atomization. Instead of air used in the foregoing examples as the atomizing examples, I may, with advantage, use steam, preferably superheated steam, or other gas substantially inert with respect to the hydrocarbons. This atomizing gas should be under substantial pressure, usually within the range of 50–100 pounds per square inch.

The particular type of structure previously described is characteristic of the product of my process, but the extent of this structure characteristic may be varied somewhat depending upon the type of oil used as the hydrocarbon make. Likewise, the particle size of the carbon black product may be varied by variations in the velocity of the blast flame gases. However, as previously noted, such velocities should be substantially less than that of the entering spray streams.

I claim:

1. In the process for producing carbon black by the decomposition of hydrocarbons whereby a combustible mixture of a fluid fuel and an oxygen-containing gas is blasted longitudinally into one end of an elongated, heat-insulated reaction chamber, through the upstream end wall of the chamber, as a multiplicity of streams symmetrically positioned over the transverse area of the chamber, and is burned as it enters the chamber to form a substantially uniform stream of hot gases passing substantially longitudinally through the chamber at high velocity and turbulence, and the hydrocarbon to be decomposed is separately introduced into the chamber through said upstream end wall of the chamber as a plurality of symmetrically positioned streams, and is mixed with said hot gases and decomposed by heat absorbed therefrom to form carbon black in gaseous suspension and the carbon black is separated from the furnace effluent gases, the step of injecting the hydrocarbon streams into the hot gas stream as expanding gas-atomized liquid sprays initiated from positions located near the periphery of said end wall and so directed that the axis of symmetry of the respective sprays converge at a point lying downstream on the longitudinal axis of the chamber at an angle within the range of 15°–45° and at an initial velocity sufficiently greater than that of the blast flame gases that they are not materially deflected from their directed course before the oil has been substantially vaporized.

2. The process of claim 1 in which the reaction chamber is of circular cross-section.

3. The process of claim 1 in which the angle of spread of the respective sprays is about 15°.

4. The process of claim 1 in which the hydrocarbon to be decomposed is dispersed in an atomizing gas stream before being passed to the furnace chamber.

5. The process of claim 1 in which the ratio of atomizing gas to the hydrocarbon make is within the range of 100–150 cubic feet per gallon of oil.

6. The process of claim 1 in which the atomizing gas is preheated before being mixed with the hydrocarbon make.

7. The process of claim 1 in which the respective streams of hydrocarbon make sprays are so directed that their axes of symmetry converge on the longitudinal axis of the furnace chamber at an angle of about 15°.

8. The process of claim 1 in which the initial velocity of the spray streams is from 10 to 25 times that of the hot blast flame gas stream.

References Cited in the file of this patent

UNITED STATES PATENTS

| | | |
|---|---|---|
| 2,440,424 | Wiegand et al. | Apr. 27, 1948 |
| 2,597,232 | Ekholm et al. | May 20, 1952 |
| 2,623,811 | Williams | Dec. 30, 1952 |
| 2,659,662 | Heller | Nov. 17, 1953 |
| 2,769,692 | Heller | Nov. 6, 1956 |

FOREIGN PATENTS

| | | |
|---|---|---|
| 525,031 | Canada | May 15, 1956 |